(12) United States Patent  
Shen et al.

(10) Patent No.: US 10,084,369 B2  
(45) Date of Patent: Sep. 25, 2018

(54) ERROR AMPLIFYING AND FREQUENCY COMPENSATING CIRCUITS AND METHODS

(71) Applicant: SYNAPTICS INCORPORATED, San Jose, CA (US)

(72) Inventors: Dan Shen, Irvine, CA (US); Lorenzo Crespi, Costa Mesa, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 0 days.

(21) Appl. No.: 15/853,602

(22) Filed: Dec. 22, 2017

(65) Prior Publication Data

US 2018/0183320 A1    Jun. 28, 2018

Related U.S. Application Data

(60) Provisional application No. 62/438,447, filed on Dec. 22, 2016.

(51) Int. Cl.
| | | |
|---|---|---|
| *G05F 1/575* | (2006.01) | |
| *H02M 1/14* | (2006.01) | |
| *H02M 3/158* | (2006.01) | |
| *H02M 1/08* | (2006.01) | |
| *H02M 3/157* | (2006.01) | |

(52) U.S. Cl.
CPC ............ *H02M 1/143* (2013.01); *H02M 1/08* (2013.01); *H02M 3/157* (2013.01); *H02M 3/158* (2013.01)

(58) Field of Classification Search
CPC ...... H02M 3/158; H02M 3/156; H02M 3/155; H02M 3/157; H02M 1/14; H02M 1/143; G05F 1/56; G05F 1/562; G05F 1/575; G05F 1/565
USPC ....... 323/265, 271, 273, 275, 280, 282–285, 323/351
See application file for complete search history.

(56) References Cited

U.S. PATENT DOCUMENTS

| | | |
|---|---|---|
| 2012/0250381 A1 | 10/2012 | Takahashi |
| 2012/0268086 A1 | 10/2012 | Chou et al. |
| 2013/0294125 A1 | 11/2013 | Chen |
| 2014/0002043 A1 | 1/2014 | Li et al. |
| 2014/0117955 A1* | 5/2014 | Zoso ............... H02M 3/157 323/271 |
| 2014/0225583 A1 | 8/2014 | Huang |
| 2015/0280590 A1* | 10/2015 | Maede ............. H02M 3/157 363/21.06 |
| 2016/0301303 A1* | 10/2016 | Bari ................ H02M 3/156 |
| 2017/0168515 A1* | 6/2017 | Beck ................ G05F 1/575 |
| 2018/0032096 A1* | 2/2018 | Beck ................ G05F 1/575 |

* cited by examiner

*Primary Examiner* — Adolf Berhane  
(74) *Attorney, Agent, or Firm* — Haynes and Boone, LLP

(57) ABSTRACT

Methods and systems for implementing a closed loop DC-DC converter utilize a compensator to stabilize the output voltage of the DC-DC converter while improving the loop gain in the band of interest. A compensator may be implemented by an operational amplifier and a feedback circuit. The operational amplifier may be configured to receive a fraction of sensed output voltage at the non-inverting terminal and compare the sensed output voltage with the voltage received at the inverting terminal to generate an error signal which is used to determine the duty cycle of a pulse-width modulated signal.

19 Claims, 6 Drawing Sheets

Type I Compensator
(Prior Art)

Type II Compensator
(Prior Art)

Type III Compensator
(Prior Art)

ERROR AMPLIFYING AND FREQUENCY COMPENSATING CIRCUITS AND METHODS

CROSS-REFERENCE TO RELATED APPLICATIONS

This application claims the benefit of and priority to U.S. Provisional Patent Application No. 62/438,447 filed Dec. 22, 2016 and entitled "ERROR AMPLIFYING AND FREQUENCY COMPENSATING CIRCUITS AND METHODS," which is incorporated herein by reference in its entirety.

TECHNICAL FIELD

One or more embodiments relate generally to voltage converter circuits and more particularly, for example, to a compensator for voltage converter circuits.

BACKGROUND

Voltage converters may be employed in a variety of audio applications, including, for example, an RF power amplifier driving an antenna of a mobile device. Traditionally, power supply circuits of the RF power amplifiers are directly connected to a battery of the mobile device. However, this approach wastes a significant amount of energy and reduces battery life of the mobile device. For example, when the mobile device is in close proximity to a base station, only a fraction of a maximum power supplied by the battery is required to ensure reliable wireless voice and data communication. When the mobile device is further away from the base station, the battery may be required to supply the maximum available power to sustain a reliable wireless communication link. To maximize energy efficiency and battery life, a voltage converter capable of adjusting its output voltage may be used.

The voltage converter may be implemented, for example, as a DC-DC converter that generates a regulated dc output voltage which may be a fraction of its unregulated input dc voltage. A boost DC-DC converter in a steady state provides a regulated dc output voltage, which is higher than an unregulated input dc voltage. On the other hand, a buck DC-DC converter in a steady state provides a regulated dc output voltage, which is lower than an input dc voltage. Load perturbations or changes in the unregulated dc input voltage may cause a DC-DC converter to exhibit an output voltage ripple. To reduce the output voltage ripple, a dc-dc converter with wide bandwidth is typically needed. Unfortunately, as the bandwidth becomes wider, the dc-dc converter becomes less stable.

To design a DC-DC converter with good bandwidth and stability, a compensator may be used to regulate the output dc voltage of a DC-DC converter. The compensator compares the output voltage to a voltage reference to generate an error signal which subsequently determines the duty cycle of the pulse-width modulated signal provided by a modulator. The compensator may hold the output voltage constant by controlling the duty cycle of the pulse-width modulated signal. In a closed loop configuration, the DC-DC converter will reach a stable point of equilibrium as the output voltage approaches the reference voltage provided by a reference voltage source.

Conventional compensators are often implemented as a Type I, Type II, or Type III compensation network as illustrated in FIGS. 6A-C, respectively. A conventional Type I compensator is an integrator amplifier having a transfer function with a single pole within its frequency bandwidth at the origin. A conventional Type II compensator introduces an additional pole and a zero to shape the phase and gain response of the feedback connected voltage converter. A conventional Type III compensator uses two zeros, a pole at the origin and two additional poles to provide a phase boost and further increases the bandwidth of the voltage converter. However, these conventional approaches flatten the gain in order to make the overall closed loop voltage converter system stable.

There is, therefore, a continued need for compensators that provide high gains and a minimal output voltage overshoot in the band of interest while satisfying the stability criteria of the overall closed loop system.

SUMMARY

The present disclosure provides methods and systems for implementing a closed loop DC-DC converter that utilizes a compensator to stabilize the output voltage of the DC-DC converter while improving the loop gain in the band of interest.

In accordance with one embodiment, a compensator may be implemented by an operational amplifier and a feedback circuit or network. The operational amplifier may be operable to receive a fraction of sensed output voltage at the non-inverting terminal and compare the sensed output voltage with the voltage received at the inverting terminal to generate an error signal which is used to determine the duty cycle of a pulse-width modulated signal.

In accordance with an embodiment, a compensation circuit for a dc-dc converter comprises and amplifier, a feedback circuit and a subtractor. The amplifier comprises an inverting input coupled to a reference voltage, a non-inverting input coupled to receive a fraction of an output voltage from the dc-dc converter, and an output. The amplifier is operable to generate a first control signal in response to the non-inverting input and inverting input.

The feedback circuit is coupled between the amplifier output and the inverting input. In one embodiment, the feedback circuit further comprises a feedback capacitor connected in parallel with a feedback resistor. The feedback circuit may also comprise a low-pass filter having a capacitor coupled between the output and the reference voltage source.

The subtractor is coupled to the reference voltage and the output of the amplifier. The subtractor is operable to receive the first control signal and generate a second control signal. The second control signal is generated by determining a difference of the reference voltage and the first control signal, and modulates a duty cycle of the dc-dc converter. A pulse-width modulator coupled to the output of the subtractor may be provided to regulate the output voltage based on the second control signal. The pulse-width modulator may be further operable to generate binary signals based on the second control signal, with a duty cycle of the binary signals controlled by the control signal.

In various embodiments, the compensation circuit further comprises a reference voltage source coupled to the inverting input of the amplifier. The reference voltage may be a fixed voltage or variable voltage that controls the dc-dc converter output level. The compensation circuit may also comprise passive components coupled between the reference voltage source and the inverting input of the amplifier. The compensation circuit may also comprise a voltage divider operable to receive the output voltage from the dc-dc converter and generate the fraction of the output voltage.

In various embodiment, the compensation circuit may also comprise a switch network having a first switching device connected between an inductor and a reference node and a second switching device connected between the inductor and an output capacitor. The first and second switching devices alternate between a conducting state and a blocking state in response to the binary signals.

In one embodiment, a method for stabilizing a dc-dc converter comprises receiving a fraction of an output voltage from the dc-dc converter at a non-inverting input of an amplifier, receiving a feedback voltage and a portion of a reference voltage at an inverting input of the amplifier, generating an output signal from the amplifier in response to the fraction of the output voltage (which may be generated by a voltage divider) from the dc-dc converter, and generating a control signal to modulate a duty cycle of the dc-dc converter via a subtractor based on a voltage difference between the reference voltage and the output signal generated by the amplifier.

In various embodiment, the method may also comprise generating a pulse-width modulated signal based on the control signal, and regulating the output voltage of the dc-dc convertor using the pulse width modulated signal. The method may also comprise controlling a first switching device and a second switching device using binary signals generated by a pulse width modulator. The second switching device may conduct current when the first switching device is in a blocking state.

In one embodiment, a DC-DC boost converter comprises a switch network having a first switching device connected between an inductor and a reference node and a second switching device connected between the inductor and an output capacitor. The first and second switching devices may alternate between a conducting state and a blocking state in response to a first binary signal and a second binary signal, respectively.

The DC-DC boost converter may also comprise an output low-pass filter having the output capacitor connected between an output node and the reference node, a compensation network operable to generate an output signal in correspondence with an output voltage sensed at the output node, and a modulator configured to generate first and second binary signals based on a control signal. The compensation network may comprise an amplifier operable to receive a fraction of the output voltage at a non-inverting terminal of the amplifier and a feedback circuit connected between an output node of the amplifier and a inverting terminal of the amplifier.

In various embodiments of the DC-DC converter, the second switching device conducts current when the first switching device is in the blocking state. The first switching device may be constructed using at least one of a diode, a metal oxide semiconductor field effect transistor (MOSFET), an insulated-gate bipolar transistor (IGBT), a bipolar junction transistor (BJT), and a thyristor.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
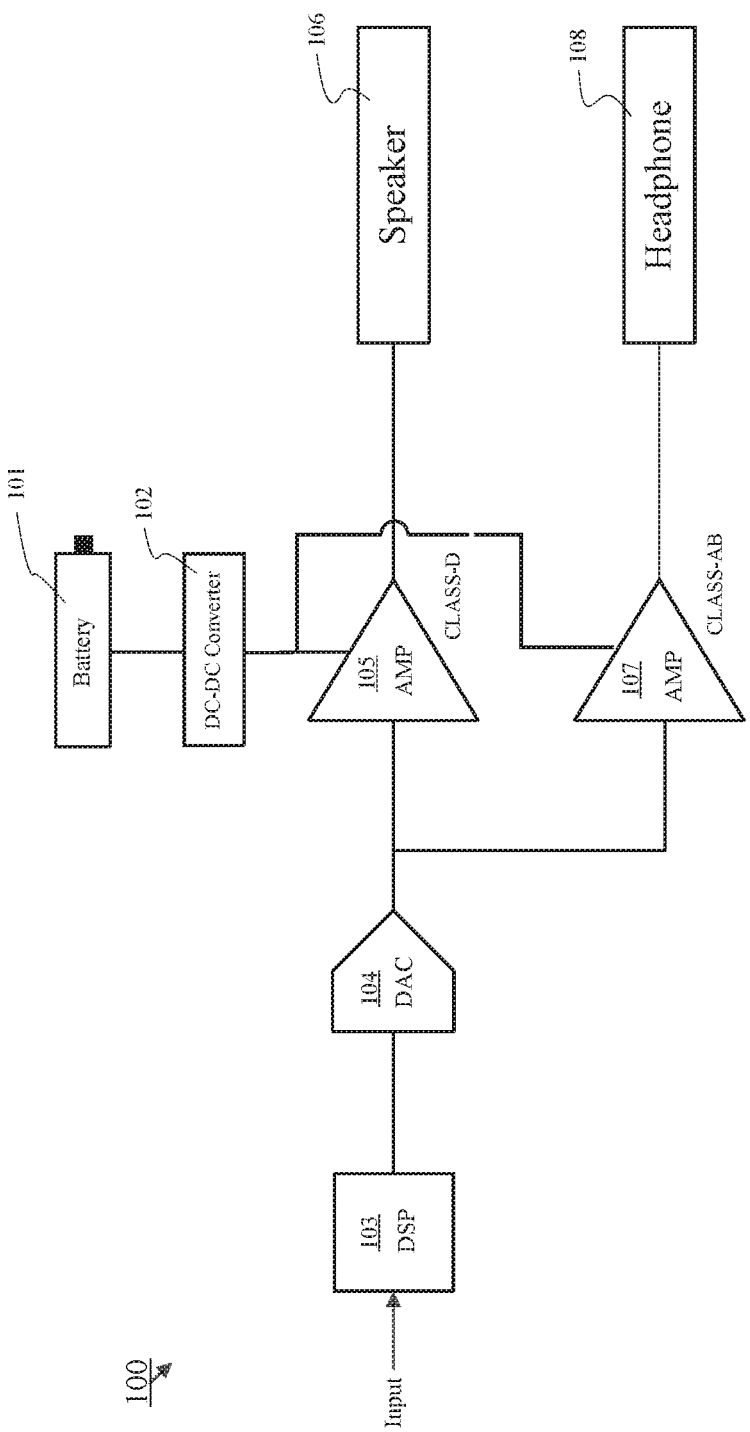
FIG. 1 illustrates an embodiment of an audio processing unit with a DC-DC converter powering audio power amplifiers.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 illustrates an embodiment of an audio processing unit 100 that processes an incoming audio input and provides an audio output to devices such as speaker 106 or headphone 108. As illustrated, digital audio input signal is received and processed by digital signal processor 103. Audio processing unit 100 converts the processed audio signal into an analog signal using digital to analog converter (DAC) 104. The analog signal output of DAC 104 may be sent to amplifiers 105 and/or 107 for further power amplification. In addition, a battery 101 may be connected to a power supply input of DC-DC converter 102, and the output of DC-DC converter 102 may be connected to the voltage supply terminal of amplifiers 105 and/or 107. When varying output power levels are desired, the power supplied to amplifiers 105/or 107 may be adjusted by DC-DC converter 102. For example, the DC-DC converter 102 may convert the voltage received from the battery at its input to an output dc voltage with a magnitude that depends on the desired supply voltage for the amplifiers 105 and/or 107. The regulated dc output voltage of DC-DC converter 102 is then applied to the voltage supply terminals of amplifiers 105 and/or 107. Furthermore, the output of amplifier 105 may be communicated to speaker 106 while the output of amplifier 107 may be communicated to headphone 108, for example.

Figure 2:
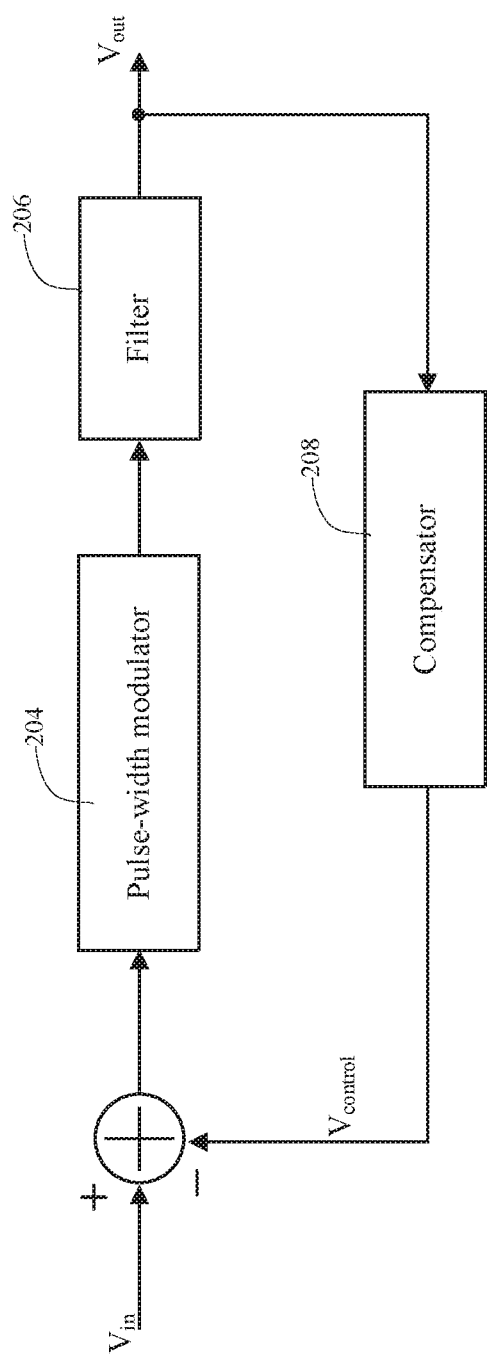
FIG. 2 illustrates a block diagram a closed loop DC-DC converter.

FIG. 2 illustrates a block diagram of a closed loop DC-DC converter. As shown in FIG. 2, pulse-width modulator 204 and filter 206 form the open loop plant while compensator 208 completes the feedback loop. The closed loop DC-DC converter uses compensator 208 to correct for undesired load perturbations or changes in the unregulated input dc voltage $V_{in}$. The compensator may adjust the duty cycle of the pulse-width modulated signal in order to provide a more uniform output dc voltage. Compensator 208 may also provide a desirable gain in the band of interest while providing stability of the closed loop DC-DC controller.

In various embodiments, filter 206 may include reactive components, which do not dissipate power and enable the DC-DC converters to operate with high power efficiency. For example, filter 206 may be implemented as a low-pass filter which suppresses the AC components in the frequency domain. In one embodiment, filter 206 may be realized by a second-order structure. In addition, the load resistance terminating filter 206 may determine filter 206 performance, loop response, and the stability of the closed loop DC-DC converter.

Referring again to FIG. 2, the closed loop gain from the input voltage $V_{in}$ to the regulated output voltage of the closed loop DC-DC converter is determined by the transfer function of pulse-width modulator 204, filter 206, and compensator 208. More specifically, the closed loop gain is characterized by the following equation:

$$H_{closed-loop} = \frac{Vout}{Vin} = \frac{H_{mod}(s) \times H_{filter}(s)}{1 + H_{compensator}(s) \times H_{mod}(s) \times H_{filter}(s)} = \frac{H_{mod}(s) \times H_{filter}(s)}{1 + H_{loop}(s)} \quad (1)$$

In equation 1, $H_{mod}(s)$ is the transfer function of pulse-width modulator 204, $H_{filter}(s)$ is the transfer function of filter 206, and $H_{compensator}(s)$ is the transfer function of compensator 208. The characteristic equation of the closed loop DC-DC converter may be obtained by setting the denominator of $H_{closed-loop}(s)$ to zero.

$$1 + H_{loop}(s) = 0 \quad (2)$$

In equation 2, $H_{loop}(s)$ is the loop gain which is the product of the transfer functions of pulse-width modulator 204, filter 206, and compensator 208. Generally, the higher the loop gain, $abs(H_{loop}(s))$, the better the transient response from the DC-DC converter, but the worse the stability. The inherent phase delay from the filter response (RHZ (right hand zero) of the boost converter makes it difficult to achieve good stability. Therefore, loop gain and transient response is compromised in conventional approaches.

To help improve loop gain while maintaining loop stability in certain applications, the Type I, II and III compensators may be used to flatten gain and improve the phase delay in the frequencies of interest. For example, a Type II compensator may include a zero, a pole at the origin, and one high-frequency pole to provide a phase boost up to 90 degrees around the frequencies of interest. In another example, a Type III compensator may include two poles (in addition to the pole at the origin) and two zeros in its input to output transfer function, which cause the Type III compensator to provide a phase boost of more than 90 degrees in the frequencies of interest. In these conventional approaches, the output feedback is connected between the inverting terminal of the operational amplifier and the input voltage (e.g, $V_{in}$). In this disclosure, embodiments of a new compensator circuit are disclosed that provide better transient response with a given stability requirement.

Figure 3:
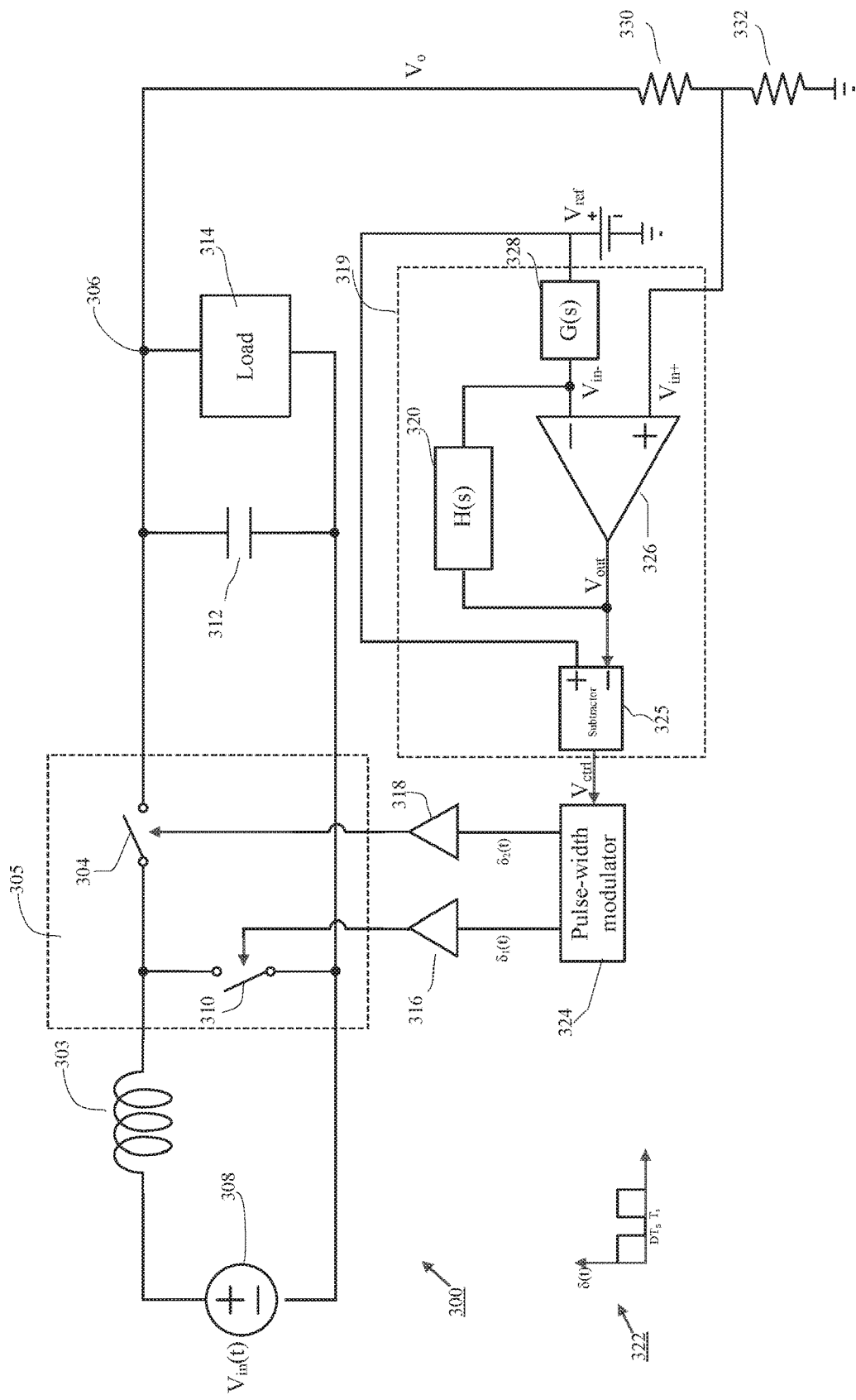
FIG. 3 illustrates an embodiment of a closed loop boost DC-DC converter with a compensation circuit.

FIG. 3 illustrates an embodiment of a closed loop boost DC-DC converter 300 along with the new compensator arranged in the feedback configuration. As illustrated in FIG. 3, the closed loop DC-DC converter is comprised of switching network 305, an output filter, pulse-width modulator (PWM) 324, and a compensator 319 (also referred to herein as a "compensation circuit") that closes the feedback loop.

The structure and operation of various components of this embodiment will be examined in more detail in the subsequent paragraphs.

The closed loop boost DC-DC converter 300 provides a step-up voltage conversion from the unregulated low input voltage $V_{in}(t)$, from voltage source 308, to the higher regulated output dc voltage $V_o$. For example, the conversion ratio of the closed loop DC-DC converter defined as the conversion ratio $M(D)$ of the regulated output dc voltage $V_o$ to the unregulated input dc voltage $V_{in}(t)$ 308 is proportional to the duty cycle of pulse-width modulated signal 322 generated by PWM 324. For example, when switch 310 is in the conducting state, electromagnetic energy is delivered from the input voltage supply to inductor 303. When switch 310 is in the blocking state and switch 304 is in the conducting state, the stored electromagnetic energy is delivered to capacitor 312 and load 314.

In various embodiments, switches that exhibit high power efficiency may be used, such as power metal oxide semiconductor field effect transistors (MOSFET), insulated-gate bipolar transistor (IGBT), bipolar junction transistors (BJT), or thyristors. In this regard, gate driver circuits 316 and 318 may be used to control switch 310 and/or switch 304 between the conducting (on) and blocking (off) states based on pulse-width modulated signal 322. In one embodiment, the compensator 319 may include operational amplifier 326, input network 328, subtractor 325, and feedback circuit 320. Feedback circuit 320 is connected between the output terminal and the inverting terminal of operational amplifier 326. In the illustrated arrangement, improved transient response is provided without compromising the stability of the DC-DC converter. In particular, input network 328 may be connected between the inverting terminal of operational amplifier 326 and the reference voltage $V_{ref}$ provided by a reference voltage source. In one specific example, input network 328 may be implemented by passive components such as resistors, capacitors, inductors transformers, diodes or any combination thereof. In addition, the output dc voltage $V_o$ is divided via resistors 330 and 332 which are connected in series between output node 306 and the ground potential. This divided voltage $V_{in+}$ is then applied to the non-inverting terminal of operational amplifier 326. It will be appreciated by those skilled in the art that, in contrast to conventional Type I/II/III compensation, the divided voltage output in the present embodiment is coupled to the non-inverting input to operational amplifier 326, and the reference voltage, $V_{ref}$, is connected to the inverting input of operational amplifier 326. Benefits of this configuration will be explained in further detail with respect the transfer function, below.

Operational amplifier 326 may generate the error signal $V_{out}$ in response to comparing the divided voltage $V_{in+}$ with the reference voltage $V_{ref}$. The compensator 319 may feed the resulting error signal $V_{out}$ into subtractor 325, which generates the control signal $V_{ctrl}$ based on the difference between the reference voltage $V_{ref}$ and the error signal $V_{out}$. Pulse-width modulator 324 may subsequently use the control signal $V_{ctrl}$ to provide pulse-width modulated binary signals that control switches 310 and/or 304. The duty cycle D of the pulse-width modulated binary signals is proportional to the error signal $V_{out}$. Therefore, in the event of undesired load perturbations or changes in the unregulated input dc voltage $V_{in}(t)$, the duty cycle of the pulse-width modulated binary signals may adjust in such a manner as to provide a regulated output dc voltage $V_o$ that follows the reference voltage $V_{ref}$.

The output of this new compensator 319 can be expressed in terms of the input and the following transfer function:

$$V_{out}=(V_{ref}-k*V_o)(1+H(s)/G(s)) \qquad (3)$$

In the above equation (3), k is the feedback gain corresponding to the ratio of a voltage divider formed by resistors 330 and 332. In this embodiment, which (in contrast to the conventional approach) includes a connection between the divided output voltage and the non-inverting input of operational amplifier 326, the input to output transfer function is 1+H(s)/G(s). This 1+H(s)/G(s) transfer function provides a gain in the present embodiment of approximately 20 dB, in frequencies below 30 KHz, for example, while providing a gain of approximately 0 db at frequencies above 40 KHz. Unlike conventional Type I/II/II compensators, which produce phase delay around the dc-dc converter loop bandwidth frequency (e.g., 1 Mhz) thereby affecting stability, the phase of the output of compensator 319 and its input will be substantially identical around the loop bandwidth frequency due to diminishing contribution of H(s)/G(s) in frequencies above 40 KHz, for example. The diminishing contribution of H(s)/G(s) in the frequencies of interest combined with input and feedback arrangements of compensator 319, allow for gain boost in the frequency band of interest without adversely affecting closed loop stability of the boost DC-DC converter.

Figure 4C:
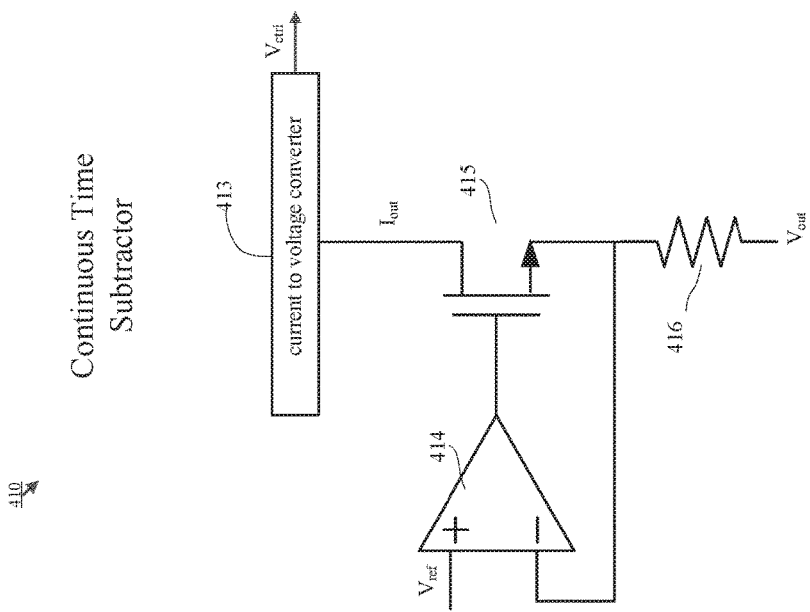
FIGS. 4A, 4B and 4C illustrate embodiments of a subtractor suitable for use in one or more embodiments of a compensation circuit of the present disclosure.
Figure 4A:
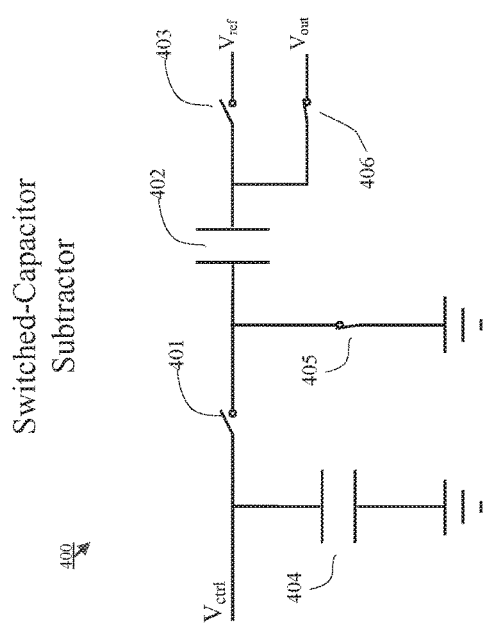
Figure 4B:
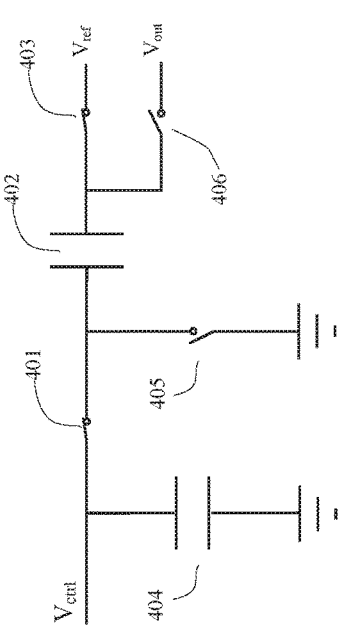

FIGS. 4A, B and C illustrate embodiments of a subtractor that may be suitable for use as subtractor 325 in FIG. 3, and in other embodiments disclosed herein. FIGS. 4A and 4B together illustrate an embodiment of a switch-capacitor subtractor 400. As illustrated, the subtractor 400 includes a first input, $V_{ref}$, coupled to a first switch 403, and a second input, $V_{out}$, coupled to the output of a compensator (such as compensator 319 of FIG. 3), which is coupled to a second switch 406. The inputs are selectively coupled to capacitor 402, which is selectively coupled to ground via a third switch 405, or to capacitor 404 and output, $V_{ctrl}$, via a fourth switch 401. Two operational states of the switched-capacitor subtractor 400 are illustrated in FIGS. 4A and 4B, respectively.

FIG. 4C illustrates and embodiment of a continuous time subtractor 410, configured to receive the output, $V_{out}$, of a compensator (such as compensator 319 of FIG. 3) and produce a control signal, $V_{ctrl}$, for output to a pulse width modulator (such as PWM 324). The compensator is coupled to the inverting input of an amplifier 414 and the source of a PMOS 415, through resistor 416. As illustrated, the gate of PMOS 415 is coupled to the output of the amplifier 414, and the drain of PMOS 415, $I_{out}$, is provided to current to voltage converter 413, which converts the current $I_{out}$ to the voltage $V_{ctrl}$.

Figure 5:
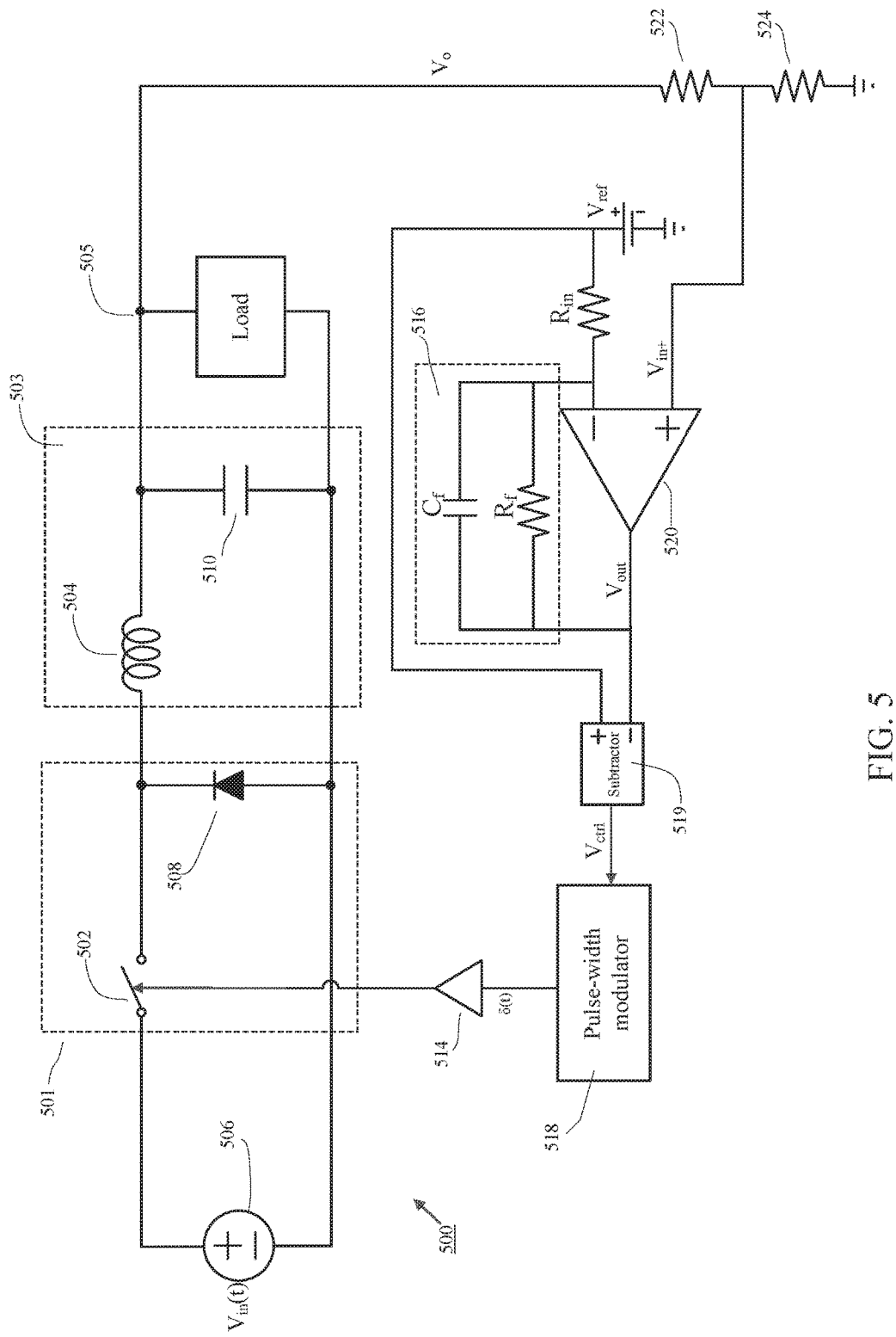
FIG. 5 illustrates a closed loop buck DC-DC converter with a first order feedback compensation circuit.
Figure 6A:
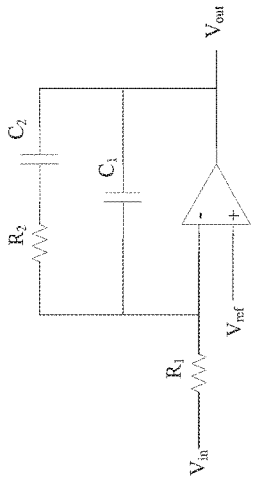
FIGS. 6A, 6B and 6C illustrate Type I, Type II and Type III compensators, respectively, as known in the prior art.
Figure 6B:
Figure 6C:
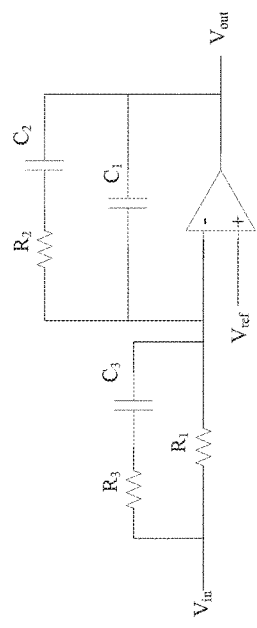

FIG. 5 illustrates a closed loop buck DC-DC converter 500 that provides a step-down voltage conversion from the unregulated high input voltage $V_{in}(t)$ 506 to the lower regulated output dc voltage $V_o$. In particular, the closed loop buck DC-DC converter 500 is comprised of switch network 501, output filter 503, pulse-width modulator 518, and a compensator that closes the feedback loop. In one embodiment, in switch network 501, switch 502 may be realized by a metal oxide field effect transistor (MOSFET).

The gate of MOSFET switch 502 may be driven by a gate driver 514 which is used to switch MOSFET switch 502 between the conducting (on) and blocking (off) states based on a pulse-width modulated signal received from pulse-width modulator 518. Thus, when MOSFET switch 502 is in the conducting state (on), the current through inductor 504 may increase since the input voltage $V_{in}(t)$ is higher than the output voltage in the buck DC-DC converter. However, when MOSFET switch 502 is in the blocking state (off), diode 508 may conduct the inductor current since the current through the inductor cannot change instantaneously. Thus, since the inductor current determines the output dc voltage, the duty cycle D that controls the switching period of a switching device, such as MOSFET switch 502, may cause the output dc voltage to follow the desired reference voltage.

In view of the present disclosure, a feedback compensator may be constructed to vary the duty cycle of pulse-width modulated signal to cause the output dc voltage to follow the desired reference voltage. In this regard, the output dc voltage $V_o$ may be sensed using the voltage divider formed using resistor 522 and resistor 524 connected in series, and compared with a reference voltage $V_{ref}$. The resulting error signal $V_{out}$ is then fed into subtractor 519, which generates a control signal, $V_{ctrl}$. The control signal is fed to pulse-width modulator 518 to produces pulse-width modulated signal that controls the gate of MOSFET switch 502. The duty cycle D of this pulse-width modulated signal is proportional to the error signal $V_{out}$. Therefore, in the event of undesired load perturbations or changes in the unregulated input dc voltage $V_{in}(t)$, the duty cycle of the pulse-width modulated signal may adjust to provide a regulated output dc voltage $V_o$ that follows the reference voltage $V_{ref}$.

In one embodiment, the compensator may be comprised of operational amplifier 520, input resistor $R_{in}$ and feedback RC filter 516 with a capacitor $C_f$ and a resistor $R_f$ connected in parallel. Feedback RC filter 516 is coupled between the output terminal of the operational amplifier 520 and the inverting terminal of operational amplifier 520. Input resistor $R_{in}$ is coupled between the inverting terminal of operational amplifier 520 and the reference voltage $V_{ref}$. In addition, the output dc voltage $V_o$ is divided via resistor 522 and resistor 524, which are connected in series between output node 505 and the ground potential. This divided voltage $V_{in+}$ is then applied to the non-inverting input terminal of operational amplifier 520. Operational amplifier 520 generates the error signal $V_{out}$ in response to comparing the divided voltage with the reference voltage $V_{ref}$.

Although the closed loop transfer function of buck DC-DC converter exhibits double poles, parasitic resistance of capacitor 510 and inductor 504 (usually referred to as ESR) may change gain and phase characteristics of the closed loop buck DC-DC converter. Moreover, pulse-width modulator 518 and output filter 503 may add considerable phase delay degrading the closed loop phase margin of the buck DC-DC converter. Therefore, the compensator with feedback RC filter 516 connected between the output terminal and the inverting terminal of operational amplifier 520 and input resistor $R_{in}$ connected between the inverting terminal of operational amplifier 520 and the reference voltage $V_{ref}$ may be used to provide gain in the band of interest while improving the phase margin of the closed loop DC-DC converter.

What is claimed is:

1. A compensation circuit for a dc-dc converter, the compensation circuit comprising:
    an amplifier comprising an inverting input coupled to a reference voltage, a non-inverting input coupled to receive a fraction of an output voltage from the dc-dc converter, and an output, wherein the amplifier is operable to generate a first control signal in response to the non-inverting input and inverting input;
    a feedback circuit coupled between the amplifier output and the inverting input; and a subtractor coupled to the reference voltage and the output of the amplifier, wherein the subtractor is operable to receive the first control signal and generate a second control signal, wherein the second control signal is generated by determining a difference of the reference voltage and the first control signal;

wherein the second control signal modulated a duty cycle of the dc-dc converter.

2. The compensation circuit of claim 1, wherein the feedback circuit further comprises a feedback capacitor connected in parallel with a feedback resistor.

3. The compensation circuit of claim 1, further comprising a reference voltage source, wherein the reference voltage source is coupled to the inverting input of the amplifier.

4. The compensation circuit of claim 3 wherein the reference voltage is a fixed voltage that controls dc-dc converter output level.

5. The compensation circuit of claim 3, further comprising passive components coupled between the reference voltage source and the inverting input of the amplifier.

6. The compensation circuit of claim 3 wherein the feedback circuit comprises a low-pass filter having a capacitor coupled between the output and the reference voltage source.

7. The compensation circuit of claim 1 further comprising a resistor divider operable to receive the output voltage from the dc-dc converter and generate the fraction of the output voltage.

8. The compensation circuit of claim 1 further comprising a pulse width modulator coupled to the output of the subtractor and operable to regulate the output voltage based on the second control signal.

9. The compensation circuit of claim 8 wherein the pulse width modulator is further operable to generate binary signals based on the second control signal.

10. The compensation circuit of claim 9, wherein a duty cycle of the binary signals is controlled by the control signal.

11. The compensation circuit of claim 10 further comprising:
a switch network having a first switching device connected between an inductor and a reference node and a second switching device connected between the inductor and an output capacitor;
wherein the first and second switching devices alternate between a conducting state and a blocking state in response to the binary signals.

12. A method for stabilizing a dc-dc converter, the method comprising:
receiving a fraction of an output voltage from the dc-dc converter at a non-inverting input of an amplifier;
receiving a feedback voltage and a portion of a reference voltage at an inverting input of the amplifier;
generating an output signal from the amplifier in response to the fraction of the output voltage from the dc-dc converter; and
generating a control signal to modulate a duty cycle of the dc-dc converter via a subtractor based on a voltage difference between the reference voltage and the output signal generated by the amplifier.

13. The method of claim 12, wherein the fraction of the output voltage is generated via a voltage divider.

14. The method of claim 13, further comprising:
generating a pulse-width modulated signal based on the control signal; and
regulating the output voltage of the dc-dc convertor using the pulse width modulated signal.

15. The method of claim 14 further comprising:
controlling a first switching device and a second switching device using binary signals generated by a pulse width modulator.

16. The method of claim 15, wherein the second switching device conducts current when the first switching device is in a blocking state.

17. A DC-DC boost converter comprising:
a switch network having a first switching device connected between an inductor and a reference node and a second switching device connected between the inductor and an output capacitor, wherein the first and second switching devices alternate between a conducting state and a blocking state in response to a first binary signal and a second binary signal, respectively;
an output low-pass filter having the output capacitor connected between an output node and the reference node;
a compensation network operable to generate an output signal in correspondence with an output voltage sensed at the output node, wherein the compensation network comprises an amplifier receiving a fraction of the output voltage at a non-inverting terminal of the amplifier and a feedback circuit connected between an output node of the amplifier and a inverting terminal of the amplifier; and
a modulator configured to generate the first and the second binary signals based on a control signal.

18. The dc-dc converter of claim 17, wherein the second switching device conducts current when the first switching device is in the blocking state.

19. The dc-dc converter of claim 17, wherein the first switching device is constructed using at least one of a diode, a metal oxide semiconductor field effect transistor (MOSFET), an insulated-gate bipolar transistor (IGBT), a bipolar junction transistor (BJT), and a thyristor.

* * * * *